Figure 1:
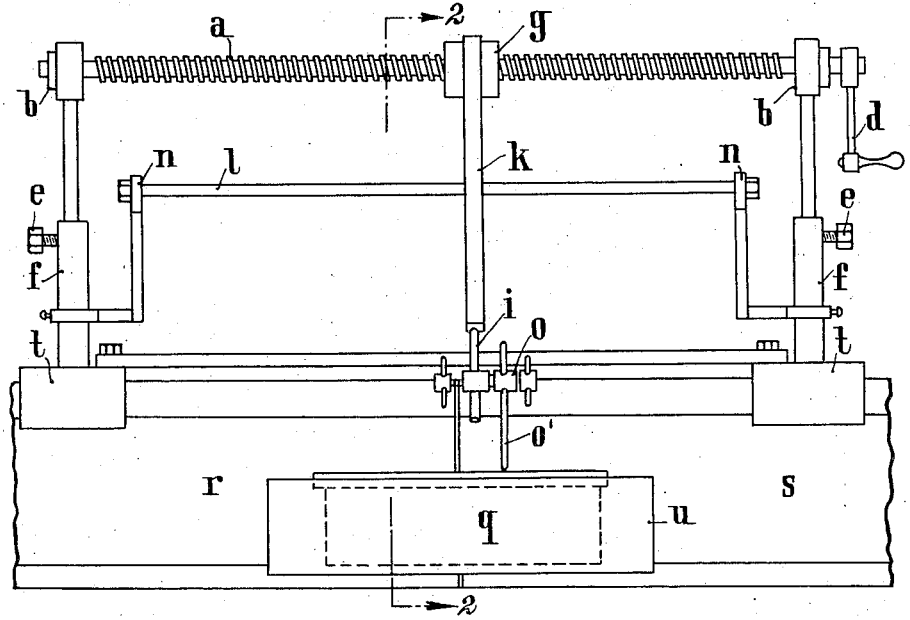

F. W. HEUSER.
PROCESS AND APPARATUS FOR MAKING BRAZED JOINTS.
APPLICATION FILED FEB. 6, 1914.

Patented Jan. 25, 1916.

Witnesses:
George DuBoy
Emm Elwill young

Inventor:
Friedrich Wilhelm Heuser
By Briesen & Knauth
Attorneys

UNITED STATES PATENT OFFICE.

FRIEDRICH WILHELM HEUSER, OF GROSS-LICHTERFELDE, NEAR BERLIN, GERMANY.

PROCESS AND APPARATUS FOR MAKING BRAZED JOINTS. REISSUED

1,169,484.      Specification of Letters Patent.      Patented Jan. 25, 1916.

Application filed February 6, 1914. Serial No. 816,903.

*To all whom it may concern:*

Be it known that I, FRIEDRICH WILHELM HEUSER, a subject of the German Emperor, residing at Gross-Lichterfelde, near Berlin, Germany, have invented a certain new, useful, and Improved Process and Apparatus for Making Brazed Joints, of which the following is a specification.

My invention relates to a process for making brazed joints by aid of the electric arc and has for its object to provide a method by means of which brazed joints of high quality as regards security of joint are produced.

A further object of my invention is to provide a method by which, in the making of secure joints as above, the brazing and the melting of brazing material is confined closely to the line along which the articles are to be united.

A further object of my invention is to provide an apparatus by means of which the process herein to be described may be effectively carried out.

Other objects will appear as the specification proceeds.

In the prior art the making of brazed joints by use of the electric arc has been usual but the joints produced have not been altogether satisfactory. According to the method generally employed the working carbon of the arc, held by a suitable holder, has been drawn by the operator along the line to be brazed, after the brazing material has been placed between the articles along said line. The joint thus produced has, depending somewhat upon the form of the articles to be brazed together, either had a poorly defined brazing locus or else required in order to obtain a closely defined brazing locus and to prevent the brazing material flowing away from the joint or seam over the article to be welded, the use of molds or forms of chamotte, silicon carbid, carbon or iron. The joints thus formed have been, generally, either insecure or else deeply molten holes or channels have been produced along the line of the same.

I have observed that insecure joints always result when the prolonged axis of the working carbon instead of intersecting the end of the brazing material to be melted intersects said brazing material at some other point; in such cases the arc loses its concentrated pointed flame like aspect and splits up into a number of parts. The deeply molten holes or channels along the line of the joint are found on the other hand, when the carbon is held for a considerable time over a portion of the joint which is already completed.

In the improved process which forms part of the subject matter of the present application, I hold the working carbon so that its prolonged axis always intersects the molten end of the brazing material, and draw the carbon while so melted along the line of the joint to be brazed at a speed conforming to the speed at which the brazing material melts; this will be, in most cases, substantially uniform speed. Such process lends itself best to mechanical operation inasmuch as the necessary skill and care required to carry out the process manually is almost too much to expect of the average operator. But even with suitable apparatus for holding and guiding the carbon as above, perfect joints will not be produced unless some further means be provided for defining the seam, *i. e.*, for confining the brazing material to the line of separation between the articles to be united; and even if such defining means be the molds of the prior art (chamotte, silicon carbid, carbon or iron as above), the seams will not be thoroughly good. Under such conditions the arc will be unstable as will be evident by ocular inspection and its peculiar sound; the brazing will not be uniform and the joint will not be good at all points. I find, however, through experiment, that if a mold of good heat conducting material be used the joint becomes uniform, secure and well defined at all points. A preferred material for such purpose is copper. Where this is employed in sufficiently thick strips or bars the arc becomes very stable and a thoroughly good joint results. The arc does not tend to jump over upon the copper which, therefore, remains uninjured so that it may be used repeatedly; and after the brazing is completed the copper form is easily removed.

In the accompanying drawing there is illustrated a preferred form of apparatus for carrying out my improved process, in which—

Figure 2:
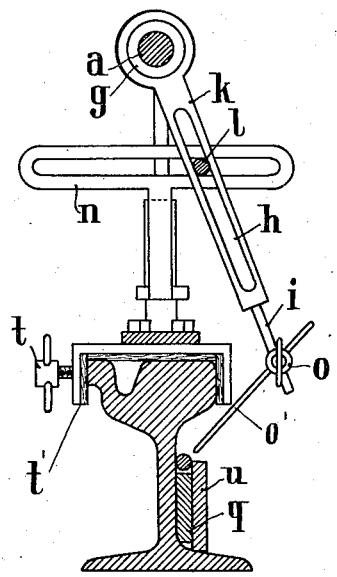

Figure 1 represents a front elevation of said apparatus and Fig. 2 a transverse section along the line 2—2 of Fig. 1.

In this drawing a worm $a$ operated by handle $d$ and supported in holders $f$ is held at any elevation by set screws $e$. A nut $g$, traveling upon the worm, carries a member $k$ provided with a slot $h$, and having at its outer end a cylindrical spindle $i$. A guide rod $l$ held laterally adjustable in arms $n$ enables the arm $k$ to be set at any desired angle in the vertical plane. The spindle $i$ carries a clamping device $o$ adjustable thereupon, in which is held the working carbon $o'$ which is therefore, adjustable so as to have its axis take any desired direction.

The apparatus as a whole is placed upon the two pieces $r$ and $s$ which are to be united together by the plate $q$, and is held in position by clamps $t$ separated by insulating material $t'$ from the pieces to be brazed. A strip of copper or other material of good heat conductivity $u$ is placed on the plate $q$ with its outer side, and the carbon properly adjusted so that its axis will lie in a plane which includes the axis of the brazing material. When the arc is struck the carbon should be adjusted in the just specified plane so that its prolonged axis will pass through the molten end of the brazing material and by turning the handle $d$, the carbon is then moved along at the desired uniform rate and its prolonged axis will continue to intersect the end of the molten brazing material. Or the carbon may be moved along by causing the worm to be driven from a suitable electric motor, the speed of which may be regulated.

The brazing material may be of any suitable substance. For making rail joints, as set forth in the specification, I prefer that this material be something analogous to that of the rails themselves as, e. g., steel or iron.

I claim:

1. The method of brazing by use of the electric arc which comprises holding the working carbon so that its axis intersects, at all times, the molten end of the brazing material and simultaneously moving said carbon in a direction parallel to the line of the joint to be brazed while, at the same time, rapidly absorbing heat from portions of the materials to be brazed which lie adjacent to the line of the proposed joint.

2. The method of brazing by use of the electric arc which comprises holding the working carbon so that its axis intersects, at all times, the molten end of the brazing material and simultaneously moving said carbon in a direction parallel to the line of the joint to be brazed while, at the same time, arranging a strip of good heat conducting material adjacent to the materials to be brazed and to the line of the proposed joint whereby the arc is stabilized and heat is rapidly transferred to said heat conducting material.

3. An apparatus for producing brazed joints comprising, in combination, means for holding the working carbon at a definite angle with respect to the work, means for moving said carbon in a direction parallel to the line of the joint, and means for rapidly absorbing heat from portions of the materials to be brazed which lie adjacent to the line of the proposed joint.

4. An apparatus for producing brazed joints comprising, in combination, means for holding the working carbon at a definite angle with respect to the work, means for moving said carbon in a direction parallel to the line of the joint, and a strip of good heat conducting material adjacent to the materials to be brazed and to the line of the proposed joint.

5. An apparatus for producing brazed joints comprising, in combination, means for holding the working carbon at a definite angle with respect to the work, means for moving said carbon in a direction parallel to the line of the joint, and a strip of copper adjacent to the materials to be brazed and to the line of the proposed joint.

In testimony whereof, I have hereunto set my hand in the presence of two subscribing witnesses.

FRIEDRICH WILHELM HEUSER.

Witnesses:
 WOLDEMAR HAUPT,
 HENRY HASPER.